(12) United States Patent
Raman et al.

(10) Patent No.: US 10,965,448 B1
(45) Date of Patent: Mar. 30, 2021

(54) DYNAMIC DISTRIBUTED STORAGE FOR SCALING BLOCKCHAIN

(71) Applicant: The Board of Trustees of the University of Illinois, Urbana, IL (US)

(72) Inventors: Ravi Kiran Raman, Champaign, IL (US); Lav Raj Varshney, Champaign, IL (US)

(73) Assignee: Board of Trustees of the University of Illinois, Urbana, IL (US)

(*) Notice: Subject to any disclaimer, the term of this patent is extended or adjusted under 35 U.S.C. 154(b) by 372 days.

(21) Appl. No.: 15/970,146

(22) Filed: May 3, 2018

Related U.S. Application Data

(60) Provisional application No. 62/500,529, filed on May 3, 2017.

(51) Int. Cl.
| | | |
|---|---|---|
| *H04L 9/08* | (2006.01) | |
| *H04L 9/32* | (2006.01) | |
| *H04L 29/08* | (2006.01) | |
| *G06Q 20/22* | (2012.01) | |
| *G06F 9/50* | (2006.01) | |
| *G06F 17/11* | (2006.01) | |

(52) U.S. Cl.
CPC .......... *H04L 9/0819* (2013.01); *G06F 9/5077* (2013.01); *G06F 17/11* (2013.01); *G06Q 20/223* (2013.01); *H04L 9/3236* (2013.01); *H04L 67/108* (2013.01); *H04L 2209/38* (2013.01)

(58) Field of Classification Search
CPC ... H04L 9/0819; H04L 67/108; H04L 9/3236; H04L 2209/38; G06F 9/5077; G06F 17/11; G06Q 20/223
See application file for complete search history.

(56) References Cited

U.S. PATENT DOCUMENTS

| | | | | |
|---|---|---|---|---|
| 8,856,549 | B2 * | 10/2014 | Resch | G06F 12/0607 |
| | | | | 713/189 |
| 10,348,640 | B2 * | 7/2019 | Baptist | G06F 21/602 |
| 2004/0111608 | A1 * | 6/2004 | Oom Temudo de Castro | ............ |
| | | | | G06F 16/182 |
| | | | | 713/156 |
| 2006/0149753 | A1 * | 7/2006 | Medard | H04L 67/1095 |
| 2013/0238900 | A1 * | 9/2013 | Leggette | G06F 11/1451 |
| | | | | 713/165 |

(Continued)

*Primary Examiner* — Joseph P Hirl
*Assistant Examiner* — Thomas A Gyorfi
(74) *Attorney, Agent, or Firm* — McDonnell Boehnen Hulbert & Berghoff LLP

(57) ABSTRACT

Examples for distributed and secure storage of a data block amongst a network of nodes are presented. An example embodiment may involve logically partitioning the network of nodes into non-overlapping zones, each zone containing a subset of the nodes and generating a private key for use within a particular zone. The embodiment may further involve encrypting the data block with the private key, partitioning the data block as encrypted into sub-blocks, and distributing the sub-blocks amongst a subset of the nodes that is within the particular zone. The embodiment may also involve using a secret sharing process to divide the private key into a number of shares equivalent to a number of nodes in the particular subset of the nodes and distributing the shares of the private key amongst the particular subset of the nodes, such that each node therein receives exactly one of the shares of the private key.

20 Claims, 10 Drawing Sheets

(56) References Cited

U.S. PATENT DOCUMENTS

| | | | |
|---|---|---|---|
| 2015/0082399 A1* | 3/2015 | Wu | H04L 9/0897 726/6 |
| 2015/0294118 A1* | 10/2015 | Parker | H04L 63/06 726/26 |
| 2016/0359770 A1* | 12/2016 | Heide | H04L 1/004 |
| 2017/0091397 A1* | 3/2017 | Shah | H04L 9/3236 |
| 2017/0250972 A1* | 8/2017 | Ronda | H04L 9/3236 |
| 2020/0021446 A1* | 1/2020 | Roennow | H04L 63/1458 |

* cited by examiner

Algorithm 1 Coding scheme for data block
for $z = 1$ to $\frac{n}{m}$ do
    Generate private key $K_t^{(z)} \sim \text{Unif}(\mathcal{K})$
    Encrypt block with key $K_t^{(z)}$ as $C_t^{(z)} = \Phi(B_t; K_t^{(z)})$
    Use a distributed storage code to store $C_t$ among peers in $\{i : p_t^{(i)} = z\}$
    Use Shamir's $(m, m)$ secret sharing scheme on $K_t^{(z)}$ and distribute the shares $(K_1^{(z)}, \ldots, K_m^{(z)})$ among peers in the zone
end for

FIGURE 7

Algorithm 2 Recovery scheme for data block
$\mathcal{N} \leftarrow [n]$
Using polynomial interpolation on the shares, compute $K_t^{(z)}$, for all $z \in [\frac{n}{m}]$
Decode blocks $B_t^{(z)} \leftarrow \Psi\left(C_t^{(z)}; K_t^{(z)}\right)$, for all $z \in [\frac{n}{m}]$
if $|\{B_t^{(z)} : z \in [\frac{n}{m}]\}| > 1$ then
    for $\tau = t$ to $T$ do
        Using polynomial interpolation from the hash shares, compute $H_\tau^{(z)}$, for all $z \in [\frac{n}{m}]$
        Determine $W_\tau^{(z)} = (B_\tau^z, H_{\tau-1}^z)$, for all $z \in [\frac{n}{m}]$
        Determine hash inconsistencies $\mathcal{I} \leftarrow \left\{i \in [n] : h\left(W_\tau^{(z)}\right) \neq H_\tau^{(z')}, z = p_\tau^{(i)}, z' = p_{\tau+1}^{(i)}\right\}$
        $\mathcal{N} \leftarrow \mathcal{N} \setminus \mathcal{I}$
        if $\left|\left\{B_t^{(p_t^{(i)})} : i \in \mathcal{N}\right\}\right| = 1$ then
            break
        end if
    end for
end if
return Majority in $\left\{\left\{B_t^{(p_t^{(i)})} : i \in \mathcal{N}\right\}\right\}$

FIGURE 8

Algorithm 3 Encryption scheme $T \leftarrow \text{Unif}(\mathcal{T})$, $K$ is the corresponding private key, $b \leftarrow \text{Bern}(1/2)$
Assign peers to nodes, i.e., peer $i$ is assigned to node $\theta_i$
For all $i \neq v_0$, $\tilde{C}_i \leftarrow B_i \oplus B_{\mu_i}$
$\tilde{C}_{v_0} \leftarrow \left( \oplus_{j \neq v_0} \tilde{C}_j \right) \oplus B_{v_0}$
if $b = 1$ then
    Flip the bits of $\tilde{C}_{v_0}$
end if
Store $C_i \leftarrow \tilde{C}_{\theta_i}$ at each node $i$ in the zone
Store $(K, \theta)$ using Shamir's secret sharing scheme at the peers
Store the peer assignment $\theta_i$ locally at each peer $i$

FIGURE 9

Algorithm 4 Decryption scheme

Use polynomial interpolation to recover $(K, b, \theta)$
Define $\tilde{\theta}_i \leftarrow j$ if $\theta_j = i$
if $b = 1$ then
    Flip the bits of $C_{\tilde{\theta}_{v_0}}$
end if
$B_{v_0} \leftarrow C_{\tilde{\theta}_{v_0}} \oplus_{j \neq \tilde{\theta}_{v_0}} C_j$
Iteratively compute $B_i \leftarrow C_{\tilde{\theta}_i} \oplus B_{\mu_i}$ for all $i \neq v_0$
return B

FIGURE 10

Algorithm 5 Dynamic Zone Allocation Strategy

Let $\nu_2, \ldots, \nu_{2n'}$ be the vertices of a $2n' - 1$ regular polygon, and $\nu_1$ its center
for $i = 2$ to $2n'$ do
    Let $L$ be the line passing through $\nu_1$ and $\nu_i$
    $M \leftarrow \{(\nu_j, \nu_k) :$ line through $\nu_j, \nu_k$ is perpendicular to $L\}$
    $M \leftarrow M \cup \{(\nu_1, \nu_i)\}$
    Construct zones as $\{\nu_j \cup \nu_k : (\nu_j, \nu_k) \in M\}$
end for
restart for loop

FIGURE 11

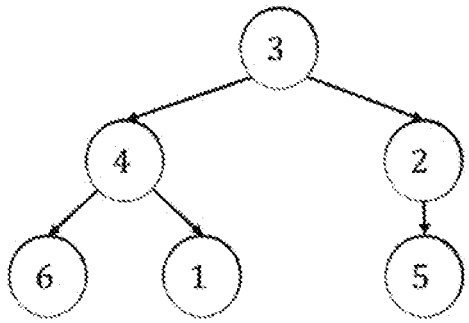
$B = (10,11,00,01,01,00)$
$b = 1, \theta = (1,2,3,4,5,6)$
$C = (11,11,01,01,10,01)$

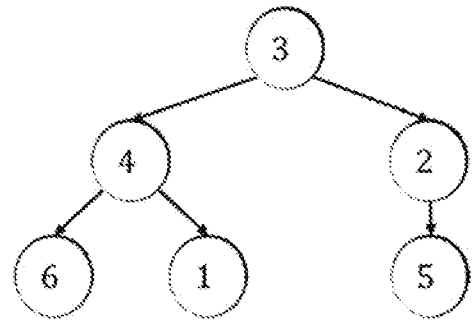
$B = (10,11,00,01,01,00)$
$b = 0, \theta = (3,4,2,6,1,5)$
$C = (10,01,11,01,11,10)$

FIGURE 12

DYNAMIC DISTRIBUTED STORAGE FOR SCALING BLOCKCHAIN

CROSS-REFERENCE TO RELATED APPLICATION

The present application claims priority to U.S. Provisional Patent Application No. 62/500,529, filed May 3, 2017, the entire contents of which are herein incorporated by reference.

BACKGROUND

A blockchain system is a secure data structure for storing data in the form of a distributed ledger supported and maintained by a network of nodes. In particular, a conventional blockchain stores entire copies of the ledger in the form a hash chain at the nodes. By distributing a copy of the ledger among nodes in the blockchain network, the stored data cannot be altered unless a majority of the copies are corrupted. This configuration, however, causes the nodes storing copies of the ledger to incur high storage costs that increases as more transactions are added. Further, some blockchain systems enforce additional constraints on hash values to enhance data integrity, such as difficulty targets used in the Bitcoin blockchain. These additional constraints can further contribute to the amount of energy required to create and maintain the blockchain.

One technique often used to reduce storage costs associated with conventional blockchain architecture involves removing older transactions from the distributed ledger. Eliminating older transactions, however, does not make a conventional blockchain more scalable to handle higher rates of transactions.

SUMMARY

Conventional blockchain architecture imposes high storage costs upon a blockchain network. To reduce storage costs, example dynamic blockchain embodiments presented herein use a combination of distributed storage, private key encryption, and secret sharing techniques to distribute and securely store data blocks. Through the combination of techniques, a dynamic blockchain can be scaled to support higher quantities of transactions while also reducing energy costs incurred by the blockchain network.

Accordingly, a first example embodiment may involve a method for distributed and secure storage of a data block amongst of a network of nodes. The first example embodiment may involve logically partitioning, by a computing device, the network of nodes into a plurality of non-overlapping zones, each zone containing a subset of the nodes and generating, by the computing device, a private key for use within a particular zone of the plurality of non-overlapping zones. The first example embodiment may also involve encrypting, by the computing device, the data block with the private key, and partitioning, by the computing device, the data block as encrypted into a plurality of sub-blocks. The first example embodiment may also involve distributing, by the computing device, the plurality of sub-blocks amongst a particular subset of the nodes that is within the particular zone, and, using a secret sharing process, dividing, by the computing device, the private key into a number of shares equivalent to a number of nodes in the particular subset of the nodes. The first example embodiment may also involve distributing, by the computing device, the shares of the private key amongst the particular subset of the nodes, such that each node therein receives exactly one of the shares of the private key.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7 illustrates a coding scheme for coding a data block into a dynamic blockchain, in accordance with example embodiments.

FIG. 8 illustrates a recovery scheme for recovering a data block from a dynamic blockchain, in accordance with example embodiments.

FIG. 9 illustrates an encryption scheme for use with a dynamic blockchain, in accordance with example embodiments.

FIG. 10 illustrates a decryption scheme for use with a dynamic blockchain, in accordance with example embodiments.

FIG. 11 illustrates a dynamic zone allocation strategy for use with a dynamic blockchain, in accordance with example embodiments.

FIG. 12 illustrates an encryption technique for a zone of peers maintaining a dynamic blockchain, in accordance with example embodiments.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Example Computing Device

Figure 1:
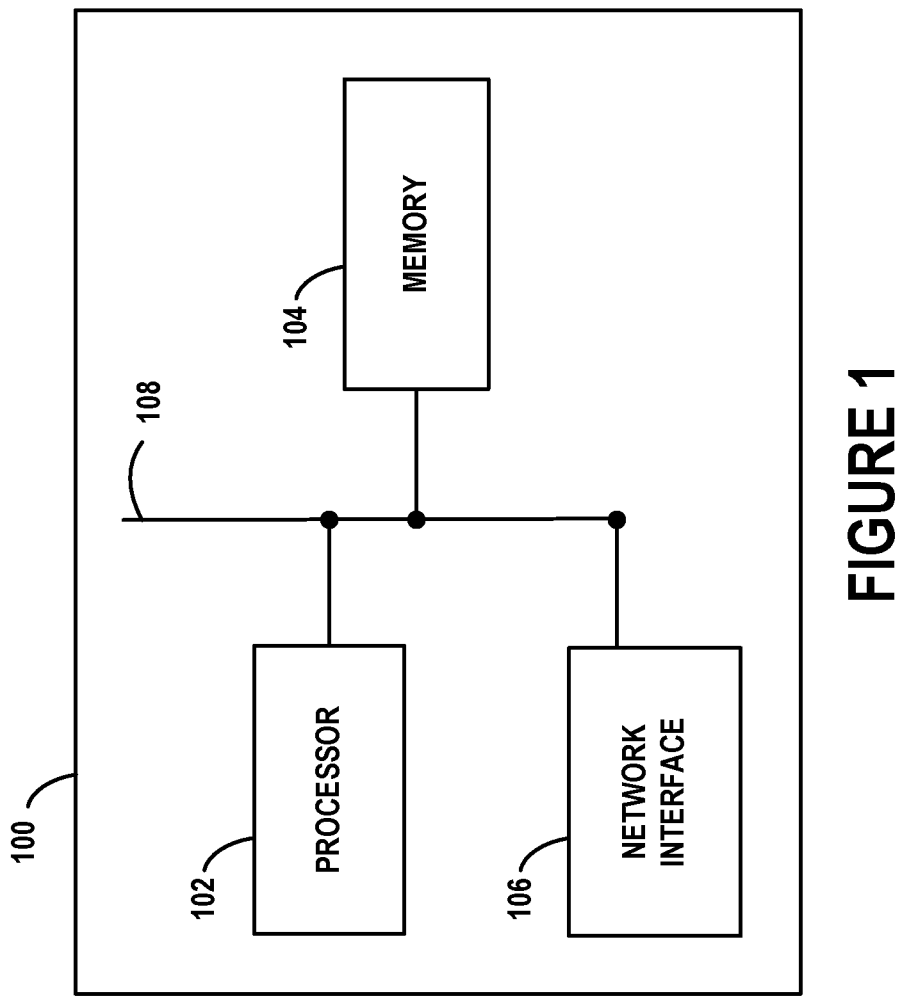
FIG. 1 illustrates a schematic drawing of a computing device, in accordance with example embodiments.

FIG. 1 illustrates a schematic drawing of a computing device 100, illustrating some of the components that could be included in a computing device arranged to operate in accordance with the embodiments herein. For example, the computing device 100 may represent a node that can support and maintain blockchain technology as part of a blockchain network (e.g., the blockchain network 200 represented in FIG. 2). The computing device 100 includes a processor 102, a memory 104, and a network interface 106, all of which may be coupled by a system bus 108 or a similar mechanism. In some embodiments, computing device 100 may include other components.

The processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, the processor 102 may be one or more single-core processors. In other cases, the processor 102 may be one or more multi-core processors with multiple independent processing units. The processor 102 may also include register memory for temporarily storing instructions being executed and related data, as well as cache memory for temporarily storing recently-used instructions and data. In some examples, the processor 102 may correspond to a specialty processor configured to enable the computing device 100 to participate in one or more blockchain networks.

The memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, the memory 104 represents both main memory units, as well as long-term storage. Other types of memory may include biological memory.

The memory 104 may store program instructions and/or data on which program instructions may operate. By way of example, the memory 104 may store these program instructions on a non-transitory, computer-readable medium, such that the instructions are executable by the processor 102 to carry out any of the methods, processes, or operations disclosed in this specification or the accompanying drawings. The memory 104 may store a ledger or portions of a ledger when the computing device 100 participates in a blockchain network.

The network interface 106 may take the form of one or more wireline interfaces, such as Ethernet (e.g., Fast Ethernet, Gigabit Ethernet, and so on). The network interface 106 may also support communication over one or more non-Ethernet media, such as coaxial cables or power lines, or over wide-area media, such as Synchronous Optical Networking (SONET) or digital subscriber line (DSL) technologies. The network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, the network interface 106 may comprise multiple physical interfaces. For instance, some embodiments of the computing device 100 may include Ethernet, BLUETOOTH®, and Wifi interfaces.

II. Example Blockchain Architecture

Figure 2:
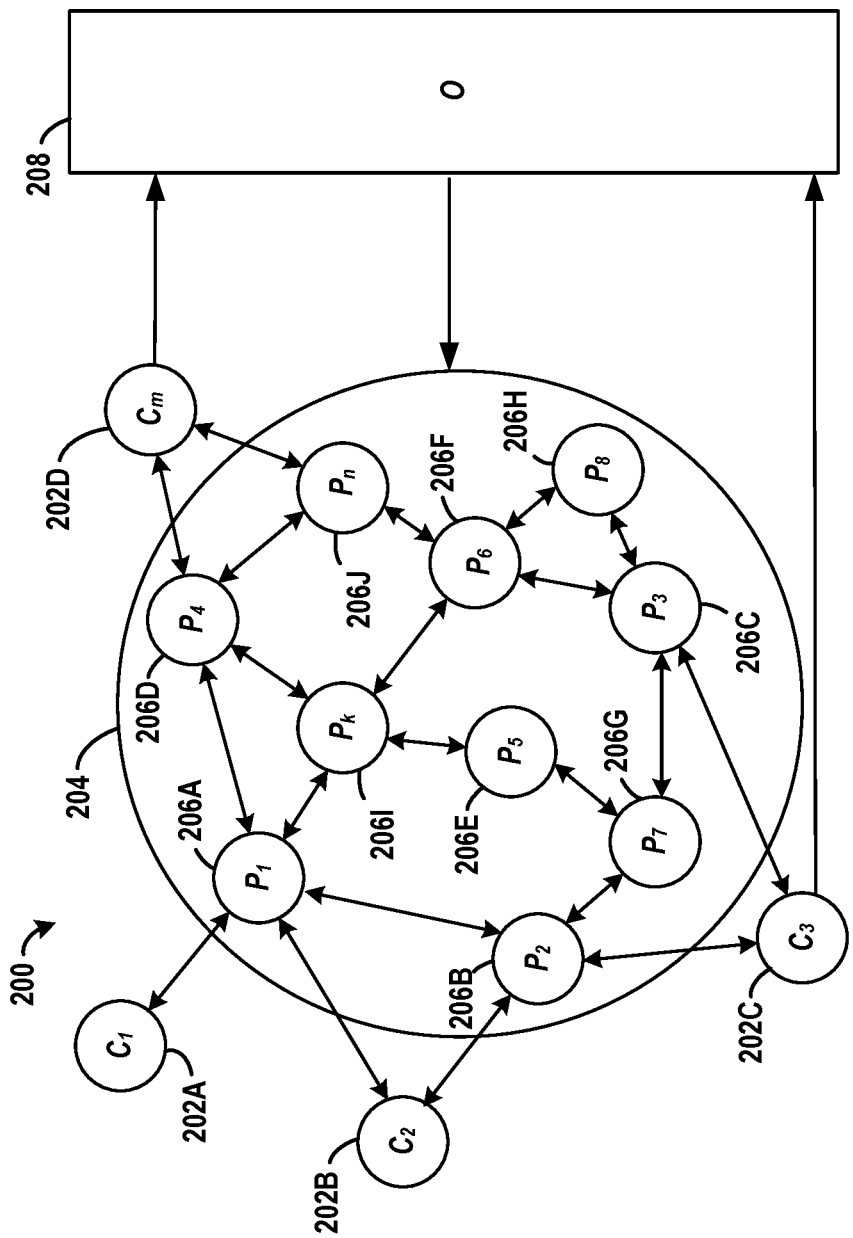
FIG. 2 illustrates architecture of a blockchain network, in accordance with example embodiments.

FIG. 2 illustrates architecture of a blockchain network 200, in accordance with example embodiments. The blockchain network 200 represents a connected peer-to-peer network of nodes that can store and maintain a current and active record of data (i.e., a distributed ledger) to form a blockchain. Each node in the blockchain network 200 can correspond to one of various types of computing devices, such as the computing device 100 described in FIG. 1.

As shown in FIG. 2, the nodes in the blockchain network 200 can be classified into three primary categories based on functionality, although nodes can perform multiple functions in some example implementations. In particular, the nodes are shown divided into clients (client $C_1$ 202A, client $C_2$ 202B, client $C_3$ 202C, and client $C_m$ 202D), peers (peer $P_1$ 206A, peer $P_2$ 206B, peer $P_3$ 206C, peer $P_4$ 206D, peer $P_5$ 206E, peer $P_6$ 206F, peer $P_7$ 206G, peer $P_8$ 206H, peer $P_k$ 206I, and peer $P_n$ 206J), and orderers (orderer O 208). The classification of the nodes into the three groups according to functionalities is shown for illustration purposes. In some examples, individual nodes can serve multiple roles across transactions. Other examples of blockchain networks can include more or less nodes arranged in other configurations (e.g., multiple orderers).

The blockchain network 200 may store transactions in the form of a distributed ledger thereby establishing a blockchain. A transaction and the nature of the data associated with the transaction can be application-specific, such as proof of fund transfer across clients in a cryptocurrency network, smart contracts in business applications, patient diagnoses and records in medical record storage, and raw data in cloud storage. The term transaction is used herein to represent all such categories.

To illustrate how the blockchain network 200 works, an example transaction is considered. In particular, the transaction may be initiated by participating clients (e.g., client $C_1$ 202A and client $C_2$ 202B), verified by endorsers (e.g., peer $P_1$ 206A and peer $P_2$ 206B), and then broadcasted by orderers (e.g., orderer O 208) for storage in the distributed ledger as a cryptographic hash chain maintained by the peers $P_1$ 206A-$P_n$ 206J. In some example implementations, the orderer O 208 communicates transactions to the peers $P_1$ 206A-$P_n$ 206J in a chronological order to ensure that the distributed ledger accurately reflects the order of recorded transactions.

The above process can be carried out by the blockchain network 200 and can be repeated to store numerous transactions in the blockchain. In addition, the blockchain network 200 can process multiple transactions simultaneously.

III. Example Hash Chain Architecture for a Dynamic Blockchain

Conventional blockchain architecture often involves distributing the ledger in the form of a cryptographic hash chain stored at peers in the blockchain network. In particular, the hash chain is a sequence of data blocks with each block including a header representing the hash value of the previous block (header included). For example, the Bitcoin blockchain uses the hash chain structure to store individual transaction data as a Merkle tree with the hash chain constructed using the Merkle root as the data in the block. A Merkle tree, also referred to as a hash tree, is a tree in which every leaf node is labelled with the hash of a data block and every non-leaf node is labelled with the cryptographic hash of the labels of its child nodes. A Merkle tree can allow efficient and secure verification of the contents of large data structures.

To further illustrate, consider the following cryptographic hash function: h: $\mathcal{M} \to \mathcal{H}$, where $\mathcal{M}$ represent a set of messages of arbitrary lengths and $\mathcal{H}$ represent the set of (fixed-length) hash values. The cryptographic hash function offers salient features for securing a blockchain, such as computational ease, pre-image resistance, collision resistance, and sensitivity. Computational ease indicates that a cryptographic hash function can be easily computed. Pre-image resistance property indicates that given $H \in \mathcal{H}$, it is computationally infeasible to find $M \in \mathcal{M}$ such that $h(\mathcal{M})=H$. Collision resistance can indicate that it is computationally infeasible to find $M_1$, $M_2 \in \mathcal{M}$ such that $h(M_2)=h(M_1)$, and sensitivity implies that any changes in hashes due to minor changes in the input are computationally indeterminable. As such, other application-specific properties can be incorporated into the hash functions and ledger depending on desired use.

Figure 3:
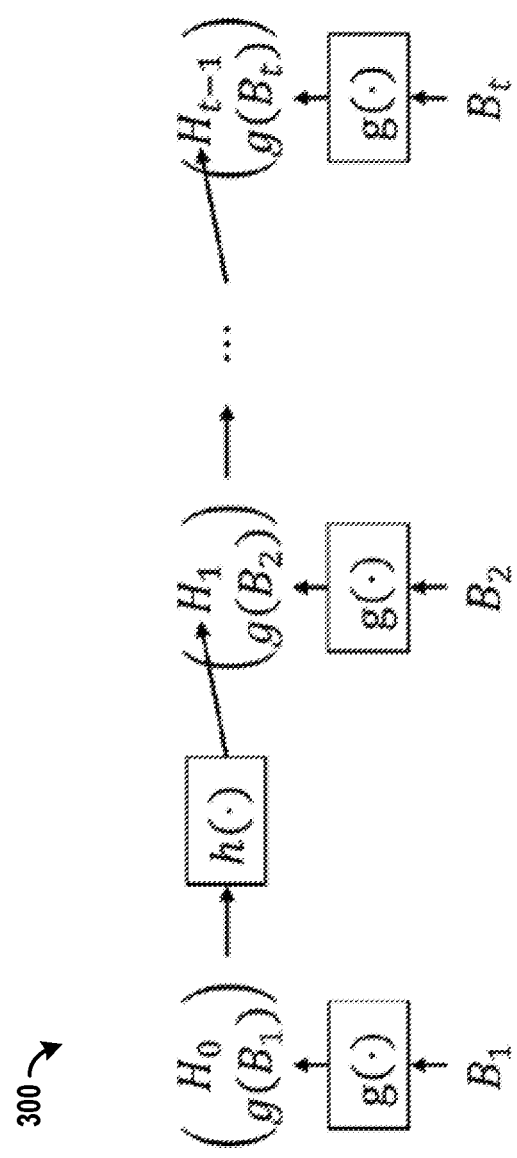
FIG. 3 illustrates a hash chain structure for a ledger of a blockchain, in accordance with example embodiments.

Some dynamic blockchain implementations presented herein use a similar, but simpler form hash chain structure where the hash chain and verification is performed using hash values of original transactions that form the hash chain. FIG. 3 illustrates a hash chain structure 300 for a ledger of a dynamic distributed blockchain. In particular, the hash chain structure 300 can reduce energy costs associated with creating and maintaining the hash chain for a dynamic blockchain.

As shown in FIG. 3, $B_t$ represents the data block corresponding to the "t-th" transaction (e.g., $B_1$, $B_2$, $B_3$), g, h each represent different hash functions, and $W_t=(H_{t-1}, g(B_t))$ represents the concatenation of the previous hash ($H_{t-1}$) and a hash of the current data ($g(B_t)$). Accordingly, $H_t=h(W_t)$ is the hash value stored with the "(t+1)-th" transaction block as represented in FIG. 3. Using the above nomenclature, FIG. 3 further shows that the hash chain can be stored by the blockchain network 200 as follows: $(H_0, g(B_1))$-$(H_1, g(B_2))$- . . . -$(H_{t-1}, g(B_t))$.

The hash chain structure 300 shown in FIG. 3 can simplify consistency verification and reduce recovery costs incurred when accessing stored data blocks while also retaining the salient features of the hash chain that directly hashed values would have. In particular, the hash chain structure 300 can reduce the computational costs imposed upon the blockchain network without sacrificing security of the blockchain. In some dynamic blockchain embodiments, the data block can be replaced by a Merkle tree structure.

IV. Example Attacks on a Dynamic Blockchain

For illustration purposes, example dynamic blockchain implementations presented herein are described with respect to two main types of attacks on a blockchain: non-adaptive, randomized denial of service (DoS) attacks, and system-aware, targeted data corruption attacks. Whereas the former can prevent data recovery, resulting in loss of stored data, the latter can result in potential alteration of stored data by an active adversary.

The two types of attacks are analyzed and discussed separately with the focus on complete data loss and on adversarial corruption within examples. In addition, in any time slot, a peer could fail (e.g., nodal failure or local data loss) independently with probability $\rho$. Let $\bar{\rho}=1-\rho$. For the adversaries attempting to corrupt a blockchain, consider a non-adaptive adversary who is unaware of the system parameters and the distribution of data among peers. These adversaries are referred to herein as DoS adversaries. Particularly, an adversary selects C peers at random, where C is chosen according to a distribution $P_{dl}(\cdot)$, to perform a DoS attack such that corrupted peers do not return the data corresponding to the requested data block. In some instances, the choice of $P_{dl}$ can be made by a budget-limited adversary aiming to maximize probability of data loss.

On the other hand, active adversaries aim to alter a value $B_t$ to some B. Defining the semantic rules of a valid corruption, an active adversary corrupting a peer can: (i) learn the contents stored in the peer; (ii) alter block content only if it has access to the block; and (iii) alter hash values preserving chain integrity (i.e., an attacker cannot invalidate other transactions in the process). In some examples, the active adversary can also be computationally limited from performing exhaustive search on the message/hash space. For ease of understanding, presume that local data loss does not occur in the presence of active corruption in some examples. Additionally, an active adversary can also be presumed to be aware of the parameters that define the data storage.

Further, let the power of the adversary to corrupt any peer in the network be characterized by the parameter $P_{tc} \in [0,1]$, the probability that a peer can be successfully corrupted. Additional presumptions can include homogeneity across the network and that the corruptions are independent and identical across the peers.

V. Example Dynamic Blockchain Implementation

Conventional blockchain architecture often involves peers storing entire copies of the distributed ledger and the use of private key encryption to establish confidentiality. Storing the copies of the entire ledger at peers in the blockchain network places a costly energy requirement upon the blockchain network. Further, although the private key is only distributed among a subset of the peers authorized to read the stored data, the conventional blockchain architecture remains susceptible to a leak at any of the authorized peers that could result in complete disambiguation of the stored data.

Figure 4:
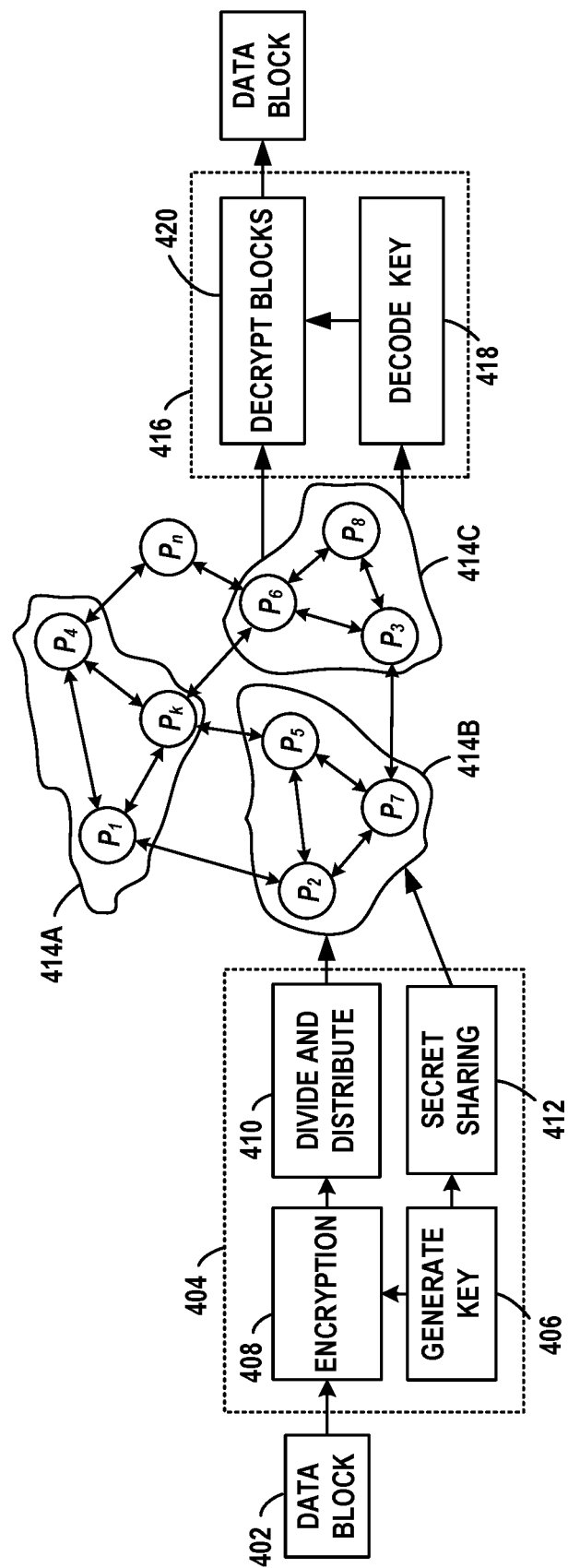
FIG. 4 illustrates storage and recovery for a dynamic distributed blockchain, in accordance with example embodiments.

To reduce energy and storage costs as well as increase security of stored data, example dynamic blockchain architecture presented herein uses a combination of distributed storage, dynamic allocation, and secret sharing. FIG. 4 illustrates storage and recovery for a dynamic blockchain, in accordance with example embodiments. The scenario 400 shown in FIG. 4 illustrates a storage process 404 for encrypting and securely storing a data block 402 in a distributed manner across multiple zones made up of nodes, as scenario 400 also illustrates a recovery process 416 for re-accessing the contents of data block 402 after storage. The scenario 400 serves as an example illustration of how the combination of private key encryption, secret key sharing, and distributed storage used in dynamic blockchain architecture can reduce or even prevent corruption of a blockchain while also lowering the energy burden placed upon the blockchain network.

Upon the initiation of a transaction between clients that are part of the blockchain network, the blockchain network may perform the storage process 404 to securely store the transaction as a data block 402 in the blockchain. One or more computing devices within the blockchain network (or communicating with the blockchain network), such as the computing device 100 shown in FIG. 1, can perform the storage process 404. In some examples, the computing system 100 may perform the storage process 404 in a manner that prevents other nodes within the blockchain network as well as adversaries from receiving information regarding the data block 402 that may jeopardize the security of the blockchain.

The storage process 404 may use a logical partition of the network of nodes into non-overlapping zones such that each zone consists of a subset of the nodes in the network. The logical partition can be a virtual division of the nodes into different groups (i.e., the non-overlapping zones). For example, for a given transaction $B_t$ occurring at any time t, the computing device 100 can choose a number $k_t \in [n]$ such that each copy of the transaction data is distributed among a set of $k_t$ peers within a blockchain network (for convenience, assume that n is divisible by $k_t$). As a result at any time t, a partition of the peers (i.e., a zone) of size $k_t$ can be selected uniformly at random. For each peer $i \in [n]$, $p_t^{(i)} \in$ $$\left[\frac{n}{m}\right]$$

can represent the zone index with the data $B_t$ then securely distributed in each zone. In some instances, selection principles can also be more application specific (i.e., designed for particular uses).

As shown in FIG. 4, the logical partition of the nodes can virtually divide the nodes into multiple zones (i.e., zone 414A, zone 414B, and zone 414C) with each zone containing an equal number of nodes. Although each zone is shown having an equal amount of nodes, other examples can involve different sized zones. Further, the logical partition serves to represent one possible virtual division of the peers in the blockchain network and can change over time to increase security of the dynamic blockchain as further described with regard to FIG. 5. For example, the computing system 100 may logically partition the nodes into different combinations in response to detecting the initiation of a second transaction for storage within the blockchain network.

Using the logical partition of the nodes shown in FIG. 4, the storage process 404 may further involve different processes, such as generating key 406, encryption 408, divide and distribute 410, and secret sharing 412.

Upon receiving a transaction for storage as a data block 402 in the dynamic blockchain, the storage process 404 involves the generation of private keys for encrypting the data block 402. In particular, generate key 406 may involve creating a private key for each zone in the non-overlapping zones (i.e., three private keys for the example shown in FIG. 4). Each generated private key can be used to encrypt the data block 402 for storage in one of the zones.

The storage process 404 further includes encryption 408, which may involve encrypting the data block 402 using the generated private key. Different encryption techniques can be used to encrypt the data block 402. For instance, an example encryption technique may involve selecting a rooted, connected tree uniformly at random on m nodes and assigning each peer in a zone to a particular node of the tree. The example encryption technique may further involve creating a code word as the modulo-2 sum of the corresponding data block and that corresponding to the parent for each node other than the root. The encryption technique can also include encrypting the root as the modulo-2 sum of all code words at other nodes and the corresponding data block. The bits stored at the root node can be flipped with probability half.

Some of the encryption techniques used for an example dynamic blockchain can differ from typical cryptography form. For instance, consider a message M where $M = (M_1, \ldots, M_m) \in \mathcal{M}$ and a private key K where $K \in \mathcal{K}$. Further, defining a given message as $\mathcal{M}$, a key as $\mathcal{K}$, and code spaces as $\mathcal{C}$, a private key encryption scheme can be represented by the following:

$$\Phi: \mathcal{M} \times \mathcal{K} \to \mathcal{C}, \tag{1}$$

$$\Psi: \mathcal{C} \times \mathcal{K} \to \mathcal{M},, \text{ such that for any } M \in \mathcal{M}, \tag{2}$$

$$\Phi(M;K) = C, \text{ such that } \Psi(\mathcal{C}, \mathcal{K}) = M, \tag{3}$$

The above encryption scheme represented by equations 1-3 can be $\epsilon$-secure if the scheme is statistically impossible to decrypt the code word in the absence of the private key K beyond a confidence of $\epsilon$ in the posterior probability. That is, if:

$$\max_{M \in \mathcal{M}} \mathbb{P}[\Psi(\mathcal{C}, \mathcal{K}) = M] \leq \epsilon. \tag{4}$$

As shown, the example encryption scheme presented above represents an invertible process that is statistically infeasible to decrypt the plaintext message beyond a degree of certainty. In particular, given a code word C, decrypting the code word is the equivalent to identifying the chosen private key. In addition, from equation 10 above, the uncertainty in the message estimation can be at least $$\log_2\left(\frac{1}{\varepsilon}\right)$$

resulting in the following:

$$\log_2\left(\frac{1}{\varepsilon}\right) \text{ bits} \leq H(M \mid C) \leq \log_2|\mathcal{K}| \text{ bits.} \quad (5)$$

Some examples may further assume without loss of generality that the encrypted code words are vectors of the same length as the message from an appropriate alphabet (i.e., $C=(C_1, \ldots, C_m)$).

As shown, secure encryption may be used to add security to a dynamic blockchain that can prevent corruption by active adversaries even when an active adversary is aware of the plaintext message. In particular, in an example scenario where an attacker is aware of the message M, and partially aware of the code word, $C_{-1}=(C_1, \ldots, C_{j-1}, C_{j+1}, \ldots, C_m)$, the attacker is statistically incapable of guessing $C_j$ in the absence of knowledge of the key K due to encryption. That produces the following:

$$\mathbb{P}[\Phi(M; K) = C \mid M, C_{-j}] \leq \frac{1}{2}, \text{ for any } C_j. \quad (6)$$

Note that this criterion indicates that the adversary is unaware of at least 1 bit of information in the unknown code fragment, despite being aware of the message (i.e., $H(C|M, C_{-1}) \geq 1$ bit).

As an another example encryption scheme, given that $T \leftarrow \text{Unif}(\mathcal{T})$, K can represents the corresponding private key, $b \leftarrow \text{Bern}(\frac{1}{2})$ represents a Bernoulli trial in which the probability of success is the same every time the experiment is conducted, and assign peers to nodes (i.e., peer i is assigned to node $\theta_i$) and for all $i \neq v_0$, $\tilde{C}_i \leftarrow B_i \oplus B_{\mu_i}$, then $\tilde{C}_{v_0} \theta(\oplus_{j \neq v_0} \tilde{C}_j) \oplus B_{v_0}$. For the example encryption scheme, if b=1, then the scheme involves flipping the bits of $\tilde{C}_{v_0}$. Accordingly, the scheme can further include storing $C_i \leftarrow \tilde{C}_{\theta_i}$ at each node i in the zone and storing (K, $\theta$) using Shamir's secret sharing scheme at the peers. The scheme may further include storing the peer $\theta_i$ locally at each peer i.

After encrypting the data block 302, the storage process 404 further includes divide and distribute 410, which may involve partitioning the data block 402 as encrypted into multiple sub-blocks and distributing the sub-blocks among a particular subset of the nodes that is within a particular zone.

By performing divide and distribute 410, a zone of nodes can collectively store the data block 402 as encrypted according to the generated private key. For example, the data block 402 can be encrypted using a first private key and then divided and distributed among the nodes in the first zone 414A such that each node includes a sub-block of the encrypted data block 402. In the above example, the data block 402 can also be similarly encrypted using a second private key and then divided and distributed amongst the nodes in the second zone 414B and again using a third private key for distribution amongst the nodes in the third zone 414C.

In addition to divide and distribute, the storage process 404 also includes secret sharing 412, which may involve using a secret sharing process to divide and distribute the private keys used for encryption amongst the nodes in the zone storing the sub-blocks of the encrypted data block 402. For instance, after encrypting the data block 402 using a first private key in order to store the data block 402 as sub-blocks in the first zone 414A, the first private key can be partitioned into shares to enable the shares to be distributed among the peers in the first zone 414 using a secret sharing process. When the private key is divided and distributed across the peers in a given zone, a single peer cannot use the private key without collusion with the other peers within the zone to decrypt the encrypted data block 402. The secret sharing process can increase security and may correspond to various types of secret sharing processes within examples, such as Shamir's secret sharing, Reed-Solomon codes, or linear codes for minimal secret sharing.

To illustrate Shamir's secret sharing, consider a secret $S \in \mathbb{F}_q$ that is to be shared with n nodes (e.g., n peers in the blockchain network 200). Particularly, n nodes represent an amount of nodes that is less than the q nodes available in the blockchain network. As such, Shamir's secret sharing holds that any subset of nodes that has a size less than k nodes is unable to obtain enough information to determine the secret shared with n nodes despite colluding together. Conversely, any subset of nodes that includes at least k nodes can obtain complete information regarding the stored secret through collusion. As a result, Shamir's (k, n) secret sharing scheme presents a method to explicitly construct a code as shown below (within the finite field arithmetic on $\mathbb{F}_q$):

$$\text{Draw } a_i \overset{i.i.d}{\sim} \text{Unif}(\mathbb{F}_q), \text{ for } i \in [k-1] \text{ and set } a_0 = S \quad (7)$$

Next, Shamir's secret can further involve determining the following:

$$y_i = a_0 + a_1 x_i + a_2 x_i^2 + \ldots + a_{k-1} x_i^{k-1}, \text{ for all } i \in [n], \quad (8)$$

where $x_i = i$. Node $i \in [n]$ receives the share $y_i$.

Since the values can be computed according to a polynomial of order k-1 using equations 7 and 8, the coefficients of the polynomial can be uniquely determined only with access to at least k points. As a result, an amount of k shares are required to obtain the secret key (i.e., intercept the secret key). Thus, Shamir's secret sharing scheme shows that a secret can be recovered if and only if at least k nodes collude together to reveal the secret.

Another implementation of a secret sharing scheme may involve assuming that each secret share is given by $(x_i, y_i)$, and choosing abscissa values uniformly at random. In other words, $x_i$ are drawn uniformly at random without replacement from $\mathbb{F}_q \setminus \{0\}$ for all $i \in [n]$. As a result, knowledge of any k-1 shares and the secret does not reveal the shares of the rest of the nodes beyond entropy of $\log_2 q$.

Shamir's scheme can be minimal in storage cost since the size of each share is the same (or approximately the same) as the size of the secret key. As a result, dynamic blockchain implementations that utilize aspects of Shamir's scheme may not significantly increase storage costs incurred by peers maintaining copies of the distributed ledger. Shamir's scheme, however, may not be secure to active adversaries in some situations, such as when an active adversary corrupts n−k+1 nodes. To overcome these situations, example dynamic blockchain implementations may further use additional security techniques presented herein, such as dynamic zone allocation over time described in FIG. 5.

In some examples, the storage process 404 may be described using the following steps: (i) generating a private key $K_t^{(z)} \sim \text{Unif}(\mathcal{K})$; (ii) encrypting each block with $K_t^{(z)}$ as $C_t^{(z)} = \Phi(B_t; K_t^{(z)})$; (iii) using a distributed storage code to store $C_t$ among peers in $\{i: p_t^{(i)} = z\}$; (iv) using Shamir's (m, m) secret sharing scheme on $K_t^{(z)}$; and (v) distributing the shares $(K_1^{(z)}, \ldots, K_m^{(z)})$ among peers in a given zone.

Some implementations of a dynamic blockchain may further involve encoding the hash values. For example, the computing system 100 may also logically partition the network of nodes into non-overlapping hash zones, each hash zone containing a subset of the nodes. In some examples, the non-overlapping hash zones can differ from the non-overlapping zones. In other examples, the non-overlapping hash zones can match the non-overlapping zones. The computing system 100 may determine a hash value corresponding to the data block and use a secret sharing process to divide the hash value. The computing system 100 may divide the hash value into a number of hash shares equivalent to a number of nodes in a particular hash zone of the non-overlapping hash zones and distribute the hash shares amongst the nodes in the particular hash zone such that each node receives exactly one of the hash shares of the hash value.

To further illustrate, assume that there exists a known process that deterministically chooses a partition $\mathcal{P}_t$ of the n peers into sets of size m each at time t. The sets of the partition $\mathcal{P}_t$ are referred to herein as hash zones. Some examples assume that n is divisible by m. The hash values are then stored using Shamir's secret sharing (or another secret sharing scheme). For example, at time t, each peer in a hash zone can store a secret share of the hash value $H_{t-1}$ generated using Shamir's (m, m) secret sharing scheme. The sharing scheme can also be used for the Merkle root $g(B_t)$.

The storage for the "t-th" transaction per peer can thus be determined using the following:

$$R_s^{(t)} = \frac{1}{k_t}\log_2 |C| + 2\log_2 |\mathcal{K}_t| + 4\log_2 p \text{ bits} \quad (9)$$

where q and p are the data and hash field sizes, and $|C|$ depends on the encryption. In example implementations where the keys are much smaller than the blocks, storage savings are created for the blockchain.

Some examples of encryption and corresponding decryption processes used within dynamic blockchain implementations can be optimal in the size of the key space up to log factors. The resulting storage cost for such a scheme may involve:

$$R_s^{(t)} = \frac{1}{k_t}\log_2 q + k_t(2\log_2 k_t + 1) + 4\log_2 p \text{ bits} \quad (10)$$

As shown, the storage costs can initially decrease with $k_t$, minimizing for a value of the order of $$O(\sqrt{\log_2 q}).$$

Figure 5:
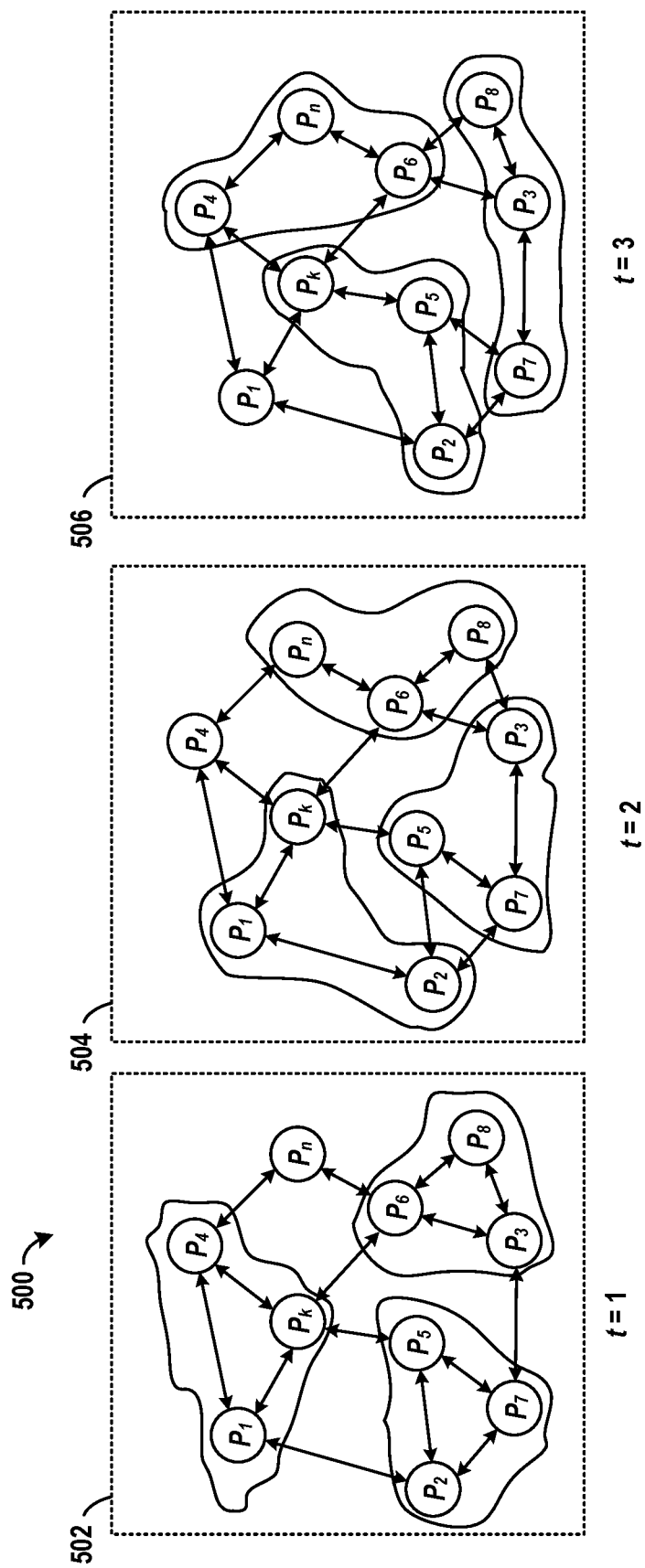
FIG. 5 illustrates dynamic zone allocation over time of the blockchain network, in accordance with example embodiments.

Further, some example implementations additionally using dynamic zone allocation strategies for the partitions used for storing the hash values. In such examples, integrity of the blockchain can be maintained because an active adversary could corrupt the blockchain only by corrupting at least n/2 peers and over time almost all peers to perform a consistent, targeted corruption of a data block. Further, note that the adversary would need to corrupt at least 2m new peers with each new block in the chain as shown in FIG. 5.

The scenario 400 further includes a recovery process 416 that can be used to obtain and access data blocks previously stored in the dynamic blockchain. As such, different recovery processes are available for accessing past transactions stored within the blockchain. In some instances, a recovery process can exploit information-theoretic security in the form of a coding scheme and can also invoke the hash-based computational integrity check established in a hash chain of the blockchain.

As shown in FIG. 4, the example recovery process 416 involves decoding key 418 and decrypting blocks 420. Decoding key 418 may involve obtaining shares of a private key from a given zone (e.g., zone 414A) and using a combination of the shares to recreate the private key. The recreated private key can be used to decrypt the sub-blocks obtained from the same zone. Decrypting blocks 420 may involve obtaining the sub-blocks of the data block 402 from a given zone of nodes (e.g., zone 414A) and using the recreated private key to create a representation of the data block 402.

In some examples, the recovery process 416 may involve initially recovering data blocks from the distributed, encrypted storage maintained at each zone of peers of the blockchain network and, in case of a data mismatch (i.e., the blocks returned from multiple zones differ), inspecting the hash chain for consistency to eliminate and remove peers that have inconsistent hash values. A hash value can qualify as inconsistent if the hash value corresponding to the data stored by the peer (or set of peers) in the previous instance fails to match the current hash value. The inconsistency check using the hash chain can eliminate at least a portion of corrupted peers enabling the consistent data returned by a majority of the peers to be identified as accurate.

In further examples of dynamic blockchain architecture, the consistency check performed during a recovery process can be limited to a finite number of the blocks returned by peers. This can reduce the computational resources utilized during the recovery process resulting in energy savings. Additionally, some implementations may use a black box (e.g., separate node) to analyze blocks returned by peers in the blockchain network to keep peers and clients within the blockchain network from becoming aware of codes, values, or other data stored within the blocks.

In another example recovery mechanism, each peer (or a subset of peers) in the blockchain network 200 can return a copy of a desired transaction (e.g., a representation of the block) and the blockchain network 200 (or one or more nodes within the network) can apply a majority rule technique to determine the contents of the desired transaction. In particular, the majority rule may indicate that contents of the block returned the most by the peers the blockchain network represents the true contents of the transaction. Other recovery mechanisms can be used when implementing a blockchain. Further, some examples may enable the client to have the freedom to choose the depth $d_t$ to look into the hash chain to return the majority consistent version.

In some examples, the communication costs between nodes while obtaining data fragments stored at each peer during the recovery process can represent most of the computational costs of the recovery process overall. To illustrate, let $C_r$ represent the cost of communicating one unit of data by all peers in the network with each peer communicating the code word corresponding to the data block and the secret share of the encryption key. This corresponds to $$\frac{1}{k_t}\log_2 q + k_t(2\log_2 k_t + 1)$$

bits.

Additionally, each peer could also communicate the secret shares of hash values corresponding to the next d blocks, each of which contributes 2 log$_2$p bits, and the corresponding data blocks for consistency check. Thus, the total worst case cost of recovering the "t-th" data block can be represented as follows:

$$R_r^{(t)} = C_r\left(\frac{1}{k_t}\log_2 q + k_t(2\log_2 k_t + 1) + 4d_t\log_2 p\right). \quad (11)$$

As shown, the recovery cost can decrease initially with $k_t$ and subsequently increases with a minimum achieved when $$k_t = 0(\sqrt{\log_2 q}).$$

For some applications, q ≫ n causing a large value of $k_t$ to reduce the recovery cost. On the other hand, the larger the depth $d_t$, the higher the recovery cost as it grows linearly.

VI. Example Dynamic Zone Allocation

FIG. 5 illustrates dynamic zone allocation over time of the blockchain network, in accordance with example embodiments. To increase security of a dynamic blockchain, a dynamic blockchain may use zone allocation patterns to alternate the peers that make up the logically partitioned zones. This strategy requires an adversary to corrupt an increasing number of peers to maintain a consistent chain structure.

To illustrate an example zone allocation pattern, FIG. 5 illustrates a first dynamic zone 502, a second dynamic zone allocation 504, and a third dynamic zone allocation 506. These dynamic zones are used for illustration purposes, but can include more or fewer nodes arranged in other configurations. For instance, another example may include more nodes logically portioned into more zones.

The first dynamic zone allocation 502 represents a first logical partition of the nodes into zones at a first time (t=1). The computing device 100 may logically partition the network of nodes into the non-overlapping zones as shown in the first dynamic zone allocation 502 for a set duration until dynamically switching into the second dynamic zone allocation.

As discussed above, in order for an adversary to obtain knowledge of the data block stored amongst the subset of nodes in one of the zones during the first dynamic zone allocation 502, the adversary would have to corrupt all the nodes in that zone and access the shares of keys and the encrypted data block. Further, the adversary would also have to maintain the hash chain that may be distributed as hash shares across hash zones.

The second dynamic zone allocation 504 represents a second logical partition of the nodes into zones during a second time (t=2). In particular, the dynamic zone allocation 504 may represent a partition of the network nodes that is subsequent to the dynamic zone allocation 502. Similar to the first dynamic zone allocation 502, the computing device 100 may logically the network of nodes into the non-overlapping zones shown in the second dynamic zone allocation 504. As a result, when the computing system 100 transitions from the first dynamic zone allocation 502 to the second dynamic zone allocation 504, the adversary would have to corrupt additional nodes to make sure the corruption chain remains consistent. The corruption chain may require the hash values as stored across hash zones to be consistent with former hash values.

The third dynamic zone allocation 506 represents a third logical partition of the nodes into zones during a third time (t=3). The dynamic zone allocation 506 may represent a partition of the network nodes that is subsequent to both the dynamic zone allocation 502 and the dynamic zone allocation 504. By transitioning into the third dynamic zone allocation 506, an adversary attempting to corrupt the blockchain would have to corrupt even more nodes to maintain consistency.

In some embodiments, the hash values may also be distributed across different hash zones in a similar dynamic manner. In particular, the computing device 100 can transition hash zones over time such that different peers are grouped within each hash zone over time. This could increase the security of the blockchain since the adversary may be required to corrupt all the peers to maintain consistency of the corruption due to the dynamically changes of the groups of nodes as zones. In fact, the adversary would eventually need to corrupt all peers in the blockchain network after enough logical partitions occur.

As discussed above, example distributed secure encoding can ensure that corrupting a transaction block or a hash requires an adversary to corrupt all peers in the zone. This fact can be exploited to ensure that with each transaction following the transaction to be corrupted, the client would need to corrupt an increasing set of peers to maintain a consistent version of the corrupted chain. In particular, in an example scenario, a blockchain may have the following state: $(H_0, B_1)$ -$(H_1, B_2)$- . . . -$(H_{t-1}, B_t)$. An adversary is attempting to corrupt the transaction entry from $B_1$ to $B'_1$. The validated, consistent version of such a corrupted chain would cause the blockchain to appear as the following: $(H_0, B'_1)$-$(H_1, B_2)$ - . . . -$(H'_{t-1}, B_t)$.

If the zone segmentation used for the encoding process is static, then the adversary can easily maintain such a corrupted chain at half the peers to validate its claim in the example scenario. If each peer is paired with varying sets of peers across blocks, then, for sufficiently large time t, each corrupted peer can eventually pair with an uncorrupted peer making an overall corruption of the blockchain much more difficult. For example, each corrupted peer can pair with an uncorrupted peer for a set of corrupted peers at a slot τ. Then, in order to successfully corrupt the hash value $H_{\tau-1}$ to $H'_{\tau-1}$, the adversary would need to corrupt the rest of the uncorrupted peers in the new zone. On the other hand, if the client does not corrupt these nodes, then the hash value remains unaltered indicating the inconsistencies of the corrupted peers.

As shown, when the zone of peers are dynamically well distributed, corrupting a single transaction would eventually require corruption of the entire network of peers, and not just the majority increase the security of the blockchain. For example, the total number of feasible zone allocations can be given by the following:

$$\text{No. of zone allocations} = \frac{n!}{(m!)^{\frac{n}{m}}} \approx \frac{\sqrt{2\pi n}}{\left(\sqrt{2\pi m}\right)^{\frac{n}{m}}}\left(\frac{n}{m}\right)^n, \quad (12)$$

Equation 12 shows that the number of feasible zone allocations increases exponentially with the number of peers and also monotonically decreases in the zone size m. Equation 12 also indicates that naive deterministic cycling through this set of all possible zone allocations is practically infeasible. Some example dynamic allocations may be configured to ensure that every peer is eventually grouped with every other peer in the blockchain network. Further, the blockchain system needs to ensure inform security for every transaction and to this end, the allocation process should also be fair.

In order to better understand the zone allocation strategy, an example combinatorial problem is described below. In particular, for the example problem, a dynamic zone allocation may be used where $v_2 \ldots, v_{2n'}$ represent the vertices of a $2n'-1$ regular polygon and $v_1$ its center. In such an example, for $i=2$ to $2n'$, the following may be performed: (i) Let L be the line passing through $v_1$ and $v_i$; $M \leftarrow \{(v_j, v_k):$ line through $v_j, v_k$ is perpendicular to L$\}$; and $M \leftarrow M \cup \{(v_1, v_i)\}$; and construct zones as $\{v_i \cup v_k: (v_j, v_k) \in M\}$. This process can be performed in a loop to constantly adjust the zone allocations across peers.

VII. Example Operations

Figure 6:
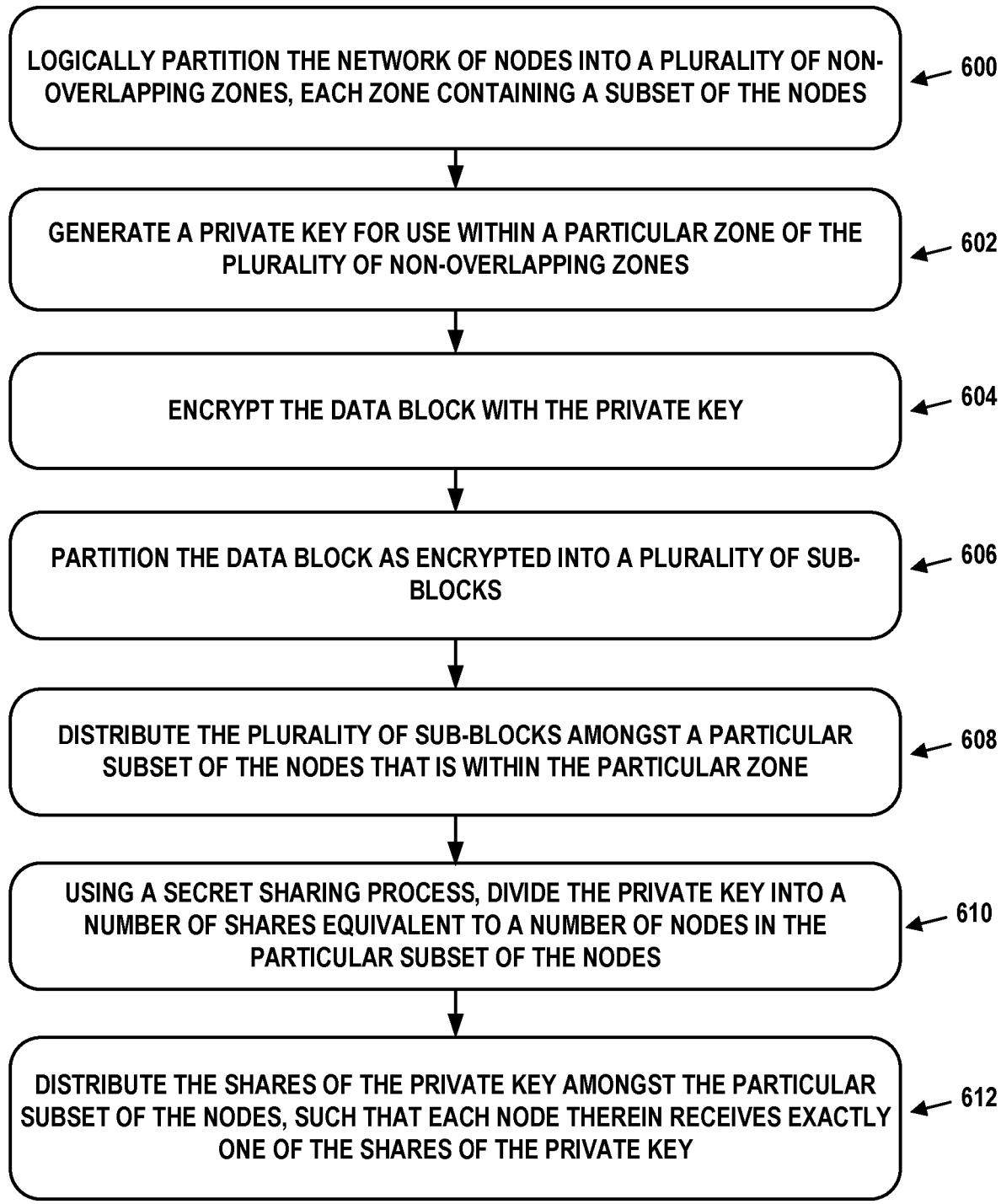
FIG. 6 illustrates a method, in accordance with example embodiments.

FIG. 6 is a flow chart illustrating an example embodiment. The process illustrated by FIG. 6 may be carried out by a computing device, such as computing device 100. However, the process can be carried out by other types of devices or device subsystems. For example, the process could be carried out by a portable computer, such as a laptop or a tablet device.

The embodiments of FIG. 6 may be simplified by the removal of any one or more of the features shown therein. Further, these embodiments may be combined with features, aspects, and/or implementations of any of the previous figures or otherwise described herein.

These embodiments may be generally directed to implementing distributed and secure storage of a data block amongst a network of nodes.

Block 600 may involve logically partitioning the network of nodes into a plurality of non-overlapping zones, each zone containing a subset of the nodes. In some embodiments, each of the non-overlapping zones contains an equal number of nodes.

Block 602 may involve generating a private key for use within a particular zone of the plurality of non-overlapping zones.

Block 604 may involve encrypting the data block with the private key.

Block 606 may involve partitioning the data block as encrypted into a plurality of sub-blocks.

Block 608 may involve distributing the plurality of sub-blocks amongst a particular subset of the nodes that is within the particular zone.

Block 610 may involve, using a secret sharing process, dividing the private key into a number of shares equivalent to a number of nodes in the particular subset of the nodes.

Block 612 may involve distributing the shares of the private key amongst the particular subset of the nodes, such that each node therein receives exactly one of the shares of the private key.

In some embodiments, a number of the plurality of sub-blocks is equivalent to the number of nodes in the particular subset of the nodes. For example, distributing the plurality of sub-blocks amongst the particular subset of the nodes may involve transmitting the plurality of sub-blocks to the particular subset of the nodes such that each node therein receives exactly one sub-block of the plurality of sub-blocks.

Some example embodiments may further involve generating a second private key for use within a second zone of the plurality of non-overlapping zones and encrypting the data block with the second private key. These example embodiments may also involve partitioning the data block as encrypted with the second private key into a second plurality of sub-blocks and distributing the second plurality of sub-blocks amongst a second subset of the nodes that is within the second zone. The example embodiments may also involve, using the secret sharing process, dividing the second private key into a second number of shares equivalent to a second number of nodes in the second subset of the nodes that is within the second zone, and distributing the shares of the second private key amongst the second subset of the nodes that is within the second zone, such that each node therein receives exactly one of the shares of the second private key.

Some example embodiments may further involve logically partitioning the network of nodes into a plurality of non-overlapping hash zones, each hash zone containing a subset of the nodes and determining a hash value corresponding to the data block. In some examples, the plurality of non-overlapping hash zones differs from the plurality of non-overlapping zones. In other examples, the plurality of non-overlapping hash zones match the plurality of non-overlapping zones. The embodiments may further involve, using the secret sharing process, dividing the hash value into a number of hash shares equivalent to a number of nodes in a particular hash zone of the plurality of non-overlapping hash zones, and distributing the hash shares amongst the nodes in the particular hash zone, such that each node therein receives exactly one of the hash shares of the hash value.

Some example embodiments may further involve obtaining the plurality of sub-blocks and the shares of the private key from the particular subset of the nodes that is within the particular zone, and using a combination of the shares of the private key, decrypting the plurality of sub-blocks to recreate a representation of the data block as stored within the particular zone. The example embodiments may further involve generating a second private key for use within a second zone of the plurality of non-overlapping zones, encrypting the data with the second private key, partitioning the data block as encrypted using the second private key into a second plurality of sub-blocks, and distributing the second plurality of sub-blocks amongst a second subset of the nodes that is within the second zone. The example embodiments may also involve using the secret sharing process, dividing the second private key into a second number of shares equivalent to a second number of nodes in the second subset of the nodes, and distributing the shares of the second private key amongst the second subset of the nodes, such that each node therein receives exactly one of the shares of the second private key.

Some example embodiments may also involve obtaining the second plurality of sub-blocks and the shares of the second private key from the second subset of the nodes that is within the second zone, and, using a combination of the shares of the second private key, decrypting the second plurality of sub-blocks to recreate a second representation of the data block as stored within the second zone.

Some example embodiments may also include performing a comparison between the representation of the data block as stored within the particular zone and the second representation of the data block as stored within the second zone, and based on the representation of the data block matching the second representation of the data block, recreating the data block using the representation of the data block as stored within the particular zone.

Some example embodiments may also include performing a comparison between the representation of the data block as stored within the particular zone and the second representation of the data block as stored within the second zone, and based on the comparison, determining that the representation of the data block as stored within the particular zone differs from the second representation of the data block as stored within the second zone. The embodiments may also include performing a scan of hash values stored amongst the particular subset of the nodes that is within the particular zone and the second subset of the nodes that is within the second zone, and based on the scan of the hash values, determining that one or more nodes in the particular subset of the nodes that is within the particular zone includes an inconsistent hash value. The embodiments may also include recreating the data block using the second representation of the data block as stored within the second zone.

Some example embodiments may further involve logically partitioning the network of nodes into a second plurality of non-overlapping zones that is different from the plurality of non-overlapping zones, each zone containing a further subset of the nodes. The example embodiments may involve generating a second private key for use within a second zone of the second plurality of non-overlapping zones, encrypting a second data block with the second private key, and partitioning the second data block as encrypted into a second plurality of sub-blocks. The example embodiments may also include distributing the second plurality of sub-blocks of the second data block amongst a further subset of the nodes that is within the second zone, dividing the second private key into a second number of shares equivalent to a second number of nodes in the second subset of the nodes using the secret sharing process, and distributing the shares of the second private key amongst the second subset of the nodes, such that each node therein receives exactly one of the shares of the second private key.

Some example embodiments may involve encrypting the data block as a code vector with the private key. The example embodiments may further involve partitioning the code vector into a plurality of components and distributing the plurality of components of the code vector amongst the particular subset of the nodes that is within the particular zone. In some examples, the plurality of components of the code vector may be distributed such that each node in the particular zone receives one component of the code vector.

FIG. 7 illustrates a coding scheme for coding a data block into a dynamic blockchain, in accordance with example embodiments. A computing device 100 may perform the example coding scheme to cause a single copy of each data block to be stored in a distributed fashion across multiple zones made up peers supporting the dynamic blockchain. Particularly, consider a data block $B_t$ that corresponds to time t. A private key K can be generated at each zone of peers as logically partitioned for encrypting the data block $B_t$. After the data block $B_t$ is encrypted, the private key K can then be stored by the peers making up each zone using Shamir's secret key sharing scheme (or another secret sharing strategy). For example, the private key K can be divided and distributed across the peers in a given zone such that a single peer cannot use the private key K without assistance from the other peers within the zone.

The encrypted data block $B_t$ can also be distributed amongst the peers that make up the zone using one or more distributed storage schemes. As a result, the zone of peers can collectively store the data block $B_t$ encrypted according to the generated and distributed private key K. In some examples, the coding scheme can distribute components of the code vector $C_t$ representing the data block $B_t$ among the peers in the zone. Other examples can involve using other distributed storage schemes.

FIG. 8 illustrates a recovery scheme for recovering a data block from a dynamic blockchain, in accordance with example embodiments. The example recovery scheme may be used to retrieve a data block $B_t$ that is part of a blockchain storing T transactions. As discussed above, the recovery process or processes can exploit information-theoretic security in the form of a coding scheme and can also invoke the hash-based computational integrity check established in a hash chain of the blockchain.

As shown in FIG. 8, the example recovery process used within a dynamic blockchain implementation may involve initially recovering data blocks from the distributed, encrypted storage maintained at each zone of peers of the blockchain network. In case of a data mismatch (i.e., the blocks returned from multiple zones differs), the recovery process may involve inspecting the hash chain for consistency to eliminate and remove peers that have inconsistent hash values (e.g., using polynomial interpolation from hash shares for computations). A hash value can qualify as inconsistent if the hash value corresponding to the data stored by the peer (or set of peers) in the previous instance fails to match the current hash value. The inconsistency check using the hash chain can eliminate at least a portion of corrupted peers enabling the consistent data returned by a majority of the peers to be identified as accurate.

In further examples of dynamic blockchain architecture, the consistency check performed during a recovery process can be limited to a finite number of the blocks returned by peers. This can reduce the computational resources utilized during the recovery process resulting in energy savings. Additionally, some implementations may use a black box (e.g., separate node) to analyze blocks returned by peers in the blockchain network to keep peers and clients within the blockchain network from becoming aware of codes, values, or other data stored within the blocks.

FIG. 9 illustrates an encryption scheme for use with a dynamic blockchain, in accordance with example embodiments. The security of a coding scheme used within a blockchain implementation from active adversaries can depend on the encryption technique or techniques used. In some instances, a valid encryption scheme that provides integrity and confidentiality to a blockchain may satisfy the following:

$$|\mathcal{K}| \geq 2^m \tag{13}$$

By the chain rule of entropy, the following can be determined:

$$H(K,C|M)=H(K)+H(C|M,K)=H(K), \tag{14}$$

where equation 14 results from the fact that the code word is known given the private key and the message.

Again using the chain rule and equation 16, the following can further be determined:

$$H(K)=H(C|M)+H(K|C,M)$$

$$\geq \Sigma_{j=1}^{m} H(C_j|C_{-j},M) \tag{15}$$

$$\geq m \tag{16}$$

where equation 15 follows form non-negativity of entropy and the fact that conditioning only reduces entropy. Equation 16 can be determined since an active adversary may not guess a code word $C_j$ without knowing the private key K. Since keys are chosen uniformly at random, the result follows.

Some example encryption schemes may be order optimal in the size of the private key space up to log factors. For example, using $\mathcal{T}$ to represent the set of all rooted, connected trees defined on m nodes, the equation can be as follows:

$$|\mathcal{T}| = m^{(m-1)} \quad (17)$$

Using equation 17, the key space by entropy-coded form of uniform draws of a tree from $\mathcal{T}$ can be defined. Given the private key K, then all edges in the tree can become known such that V=[m] represents the nodes of the tree, $v_0$ represents the root, and $\mu_i$ represents the parent of a node i in the tree.

Given the above set up, an example encryption technique may involve selecting a rooted, connected tree uniformly at random on m nodes and assigning each peer in a zone to a particular node of the tree as previously described herein. For example, the encryption technique may further involve creating a code word as the modulo-2 sum of the corresponding data block and that corresponding to the parent for each node other than the root. The encryption technique can also include encrypting the root as the modulo-2 sum of all code words at other nodes and the corresponding data block. The bits stored at the root node can be flipped with probability half. The encryption scheme for a sample data block is illustrated in FIG. 12.

FIG. 10 illustrates a decryption scheme for use with a dynamic blockchain, in accordance with example embodiments. As shown, the example decryption scheme may involve determining the private key (i.e., the rooted tree structure, the bit, and peer assignments) and decrypting the root node by using the code words at other peers. The other blocks can be sequentially recovered by using the plain text message the parent node.

FIG. 11 illustrates a dynamic zone allocation strategy for use with a dynamic blockchain, in accordance with example embodiments. The example dynamic zone allocation strategy can provide a constructive method to create zones such that all peers are grouped with each other over time increasing security of a dynamic blockchain. The dynamic zone allocation strategy can be performed by the computing system 100 and may involve using of vertices of a regular polygon as further described in FIG. 13.

FIG. 12 illustrates an encryption technique for a zone of peers maintaining a dynamic blockchain, in accordance with example embodiments. The data block, parameters, tree structure, and corresponding codes are illustrated for a zone made up of six peers. The two cases consider the same rooted tree with varying peer assignments. The corresponding change in the code is also shown.

Figure 13:
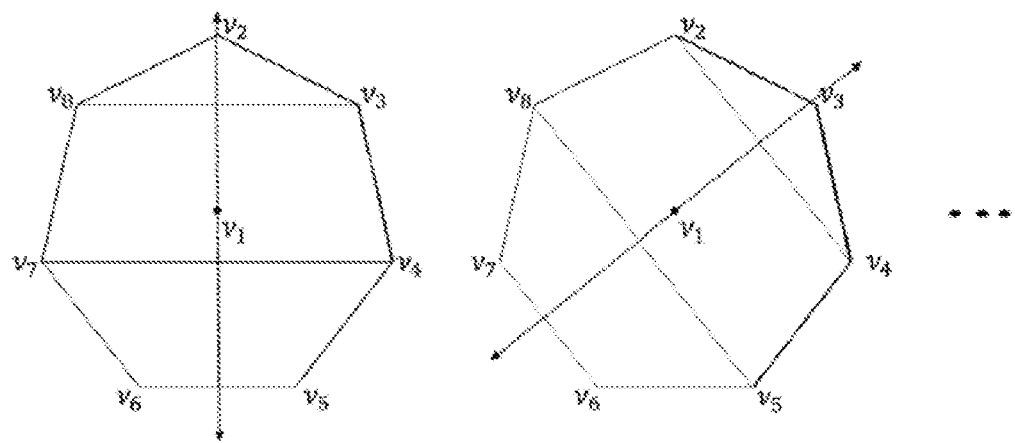
FIG. 13 illustrates a dynamic zone allocation strategy, in accordance with example embodiments.

FIG. 13 illustrates a dynamic zone allocation strategy, in accordance with example embodiments. In particular, the strategy illustrates when n=4m and involves cycling through matchings of the complete graph by viewing them in the form of the regular polygon.

To further illustrate, consider a K-way handshake problem consisting of a group of n people. At each slot of time, the people are to be grouped into sets of size m. A peer gets acquainted with all other peers in the group whom they have not met before. The problem can thus be viewed as an m-way handshake between people. As such, the minimum number of slots required for every peer to shake hands with every other peer is $$\frac{n-1}{m-1}.$$

At any slot, a peer meets at most m−1 new peers. Thus, the lower bound follows.

Note that each such grouping of nodes constitutes a matching (1-factor) of an m-uniform complete hypergraph on n nodes, $K_m^n$. Baranyai's theorem states that if n is divisible by m, then, there can exist a decomposition of $$K_m^n \text{ into } \binom{n-1}{m-1}$$

1-factors. However, an example strategy may not require every hyper edge to be covered by the allocation scheme, but only for every node to be grouped with every other node eventually.

Note that for m=2, a graph can be decomposed into M different matchings. In this case, the handshake problem is the same as the decomposition of the graph into matchings. Thus, Baranyai's theorem in this case gives us the exact number of slots to solve the problem.

Similar to the observed for the 2-way handshake problem, a strategy can be used to assign the peers in zones. For example, let n'=n/m and logically partitioning the peers into 2n' sets, each set ends up containing m/2 peers represented by $v_1, \ldots, v_{2n'}$. Then use matchings of $K_{2n'}$ can be determined to perform the zone allocation. As shown, the number of slots required for every peer to be grouped with every other peer is 2n'−1.

The results can follow directly from the cyclic decomposition and Baranyai's theorem for m=2. Inconsistent peers can removed from consideration from data recovery. Under the cyclic zone allocation strategy, the adversary needs to corrupt at least m new nodes with each new transaction to establish a consistent corruption. From the cyclic zone allocation strategy and the pigeonhole principle, each slot includes at least two honest nodes in the graph are paired with corrupt nodes. Thus, the result follows. With $$\frac{n}{2m}$$

transactions, the data becomes completely secure in the network. That is, only a corruption of all peers (not just a majority) leads to a consistent corruption of the transaction.

VIII. Example Corruption Costs

A. Example Data Loss

A data block in a blockchain can be lost when some peers undergo a DoS attack and a sufficiently large number incur random data loss. For example, consider an adversary attempting to prevent the recovery of a block B that is distributed among peers supporting a blockchain according to the parameter k. Let r=n/k represent the number of copies of the data in the peer network. As such, the data can be lost when there exists at least one node failure or DoS attack in each zone.

The adversary may select a random number $C \sim P_{d1}$ and perform a DoS attack on C uniformly random peers. Let the number of peers corrupted in the zone i be represented by $X_i$ and further let $Y_i$ be the number that undergoes data loss. Thus, $(X_1, \ldots, X_r)$ are distributed according to the multivariate hypergeometric distribution with n objects, C draws, and k objects of each of the r types. The probability of data loss given the adversary attacks C peers can be determined as follows:

$$\mathbb{P}[\text{Data Loss} \mid C] = \mathbb{P}[X_i + Y_i > 0, \text{ for all } i \in [r] \mid C] \quad (18)$$
$$= \mathbb{P}[Y_i > 0, \text{ for all } i \in [r] s.t. X_i = 0 \mid C]$$
$$= \mathbb{E}\left[(1 - \rho^{-k})^{(r - \sum_{i=1}^{r} 1\{X_i > 0\})} \mid C\right],$$

where equation 18 follows from the independence of a nodal failure and the expectation can be taken over the multivariate hypergeometric distribution described above. Here, $1\{\bullet\}$ can represent an indicator function such that the probability of data loss can be obtained by averaging equation 18 over C.

Then, for a DoS adversary limited by a budget $B_{d1}$ of the expected number of peers that the adversary can corrupt, $P_{d1}$ can be determined by solving the following linear program:

$$P_{d1} \in \arg\max_{p} \sum_{c=0}^{n} p(c) \mathbb{E}\left[(1 - \rho^{-k})^{(r - \sum_{i=1}^{r} 1\{X_i > 0\})} \mid C = c\right] \quad (19)$$
$$s.t. \sum_{c=0}^{n} c p(c) \leq B_{d1}, \sum_{c=0}^{n} p(c) = 1, \text{ and } p(c) \geq 0, \text{ for all } c.$$

Computing the conditional expectation in equation 19 can require knowledge of the probability mass function (pmf) of the number of zones with non-zero corruption, given by the following:

$$\mathbb{P}\left[\sum_{i=1}^{r} 1\{X_i > 0\} = \tilde{r}\right] = \binom{r}{\tilde{r}} \mathbb{P}\left[\sum_{i=1}^{\tilde{r}} X_i = c\right] \quad (20)$$
$$= \frac{\binom{r}{\tilde{r}}\binom{\tilde{r}k}{c}}{\binom{n}{c}}, \quad (21)$$

where equation 21 can follow from the symmetry in the zones. Then, the random variable $\sum_{i=1}^{\tilde{r}} X_i$ can follow the hypergeometric distribution with parameters n, c, and $\tilde{r}k$ representing size of population, number of draws, and number of successes, respectively, resulting in the creation of equation 21.

Solving the linear problem in equation 21 can present an idea of the budget-limited DoS adversary such that the data loss probability can be subsequently computed The optimal design choice to account for the worst case DoS adversary could then be to pick k such that it minimizes the worst case data loss probability (i.e., $k^* = \arg\min_k \max_{P_{d1}} \mathbb{P}[\text{Data Loss}]$). However, in some instances, the design choice can be more nuanced and application specific as the design could also account for other costs.

B. Example Targeted Corruption

Considering the security from active adversaries that can perform targeted corruption, presume that the adversary aims to corrupt a block B to B' when each copy of the data is distributed across k peers, and the recovery scheme searches a depth of d along the chain. Again, let r=n/k.

From the integrity guarantees established, the minimum number of peers that the active adversary can be required to successfully corrupt to perform the targeted corruption is represented as $$\frac{n}{2} + 2dm.$$

However, the corruption can be feasible only if the adversary can find a set of r/2 zones to first corrupt the block data in half the zones, and at least the subsequent 2dm peers, as determined by the dynamic zone allocation scheme to alter the hash values along the chain. Further, in some cases, the worst case may be used where the adversary has to corrupt exactly 2dm following peers. Then, the probability of successful targeted corruption of such a system can be determined as follows:

$$\mathbb{P}[\text{Targeted Corruption}] = \binom{r}{r/2} p_{tc}^{(\frac{n}{2} + 2dm)} \quad (22)$$

Both design parameters k and d can influence the integrity of stored data. In particular, a larger d can imply a lower feasibility of targeted corruption. This, however, can lead to a higher recovery cost. Also, as shown above, the larger the value of k, the smaller the probability of targeted corruption may be. However, large k values can also imply a higher probability of data loss and thus, there can exist a tradeoff in the choice.

C. Example Data Confidentiality

With relation to confidentiality of stored data, consider two scenarios. First, consider the amount of information an eavesdropper, external to the system, can receive from the knowledge of the complete cipher code stored in a zone, about the data block. Secondly, the minimum fraction of peers that can be required to collude to recover stored data.

First, assume that an external eavesdropper can receive the complete cipher text, C, but not the encryption key K corresponding to a zone. Since the block data are chosen uniformly at random, $$H(B|C) \leq H(K,B|C) = H(K) \quad (23)$$

The entropy of the transaction block can be represented as follows: $H(B) = \log_2 q > H(K)$. Thus, at any time t, the lower bound on the information revealed from the knowledge of the encrypted storage can be as follows:

$$I(B_t; C_t) \geq \log_2\left(\frac{q}{k_t(2\log_2 k_t + 1)}\right) \quad (24)$$

Note that this is the minimum amount of information that the eavesdropper can be aware of regarding the stored data. Ideally, a client might require this information leak, and at least the lower bound to be low. It can be evident that this is facilitated by a large value of $k_t$.

Next, consider peers that can collude to read stored data. From Shamir's secret sharing of the encryption key, the data can be recovered with probability one, only form the collusion of at least k peers. That is, the minimum fraction of peers that need to collude to read stored data is as follows (which emphases the need for a large $k_t$):

$$f_{il} = \frac{k_t}{n} \quad (25)$$

IX. Example Blockchain-Based Cloud Storage

As discussed above, the individual client choices of design parameters can be influenced by the variety of tradeoffs discussed herein. In particular, a dynamic blockchain can be used to securely store data. As such, in some dynamic blockchain implementations, a client can value some data blocks differently by appropriately varying the design choices.

A. Example Security-Based Scheme Selection

As an example, consider a cloud storage system that implements example coding schemes presented herein to store data on a dynamic blockchain. For the example, without loss of generality, the cost of storing one unit of data at all peers per unit time can be assumed as one, and the communication cost for data recovery, $C_r$, can be priced in relation. Further, letting the frequency of data retrieval be v, and the parameters be k, d, the storage cost per unit time can then be represented as follows:

$$\text{Service Cost} = R_s + vR_r \quad (26)$$
$$= \left(\frac{1}{k}\log_2 q + k(2\log_2 k + 1)\right)(1 + vC_r) + 2\log_2 p(1 + dvC_r)$$

Given the set of parameters, the probability of data loss, targeted corruption, and the fraction of colluding peers for information leak can be determined. Further, given a particular data type, the client can choose the design parameters by solving the following integer program:

$$(k^*, d^*) \in \arg\min_{k,d} R_s + v R_r \quad (27)$$

such that $$\mathbb{P} \text{ [Data Loss]} \leq \delta_{dl}, \quad (28)$$

$$\mathbb{P} \text{ [Targeted Corruption]} \leq \delta_{tc}, \text{ and} \quad (29)$$

$$f_{il} \leq \delta_{il}. \quad (30)$$

Note that equation 30 represents a non-linear integer program and presume knowledge of the parameters that define the adversary strength.

B. Example Data Insurance

Due to security, distributed storage on dynamic blockchain systems can offer data insurance for saved blocks of data. Here, parameter selections (storage code design) are briefly described to store data valued at a certain level such that the service provider on average obtains a certain desired profit margin.

As an example, consider storing a data valued by the client at V. Let $\mu \in [0,1]$ represent the profit margin desired by the service provider, $w_1 \in [0,1]$ represent the fraction of DoS adversaries, and $w_2 = 1 - w_1$ represent the fraction of active adversaraires. For the example, information leak through collusion may not be included. Accordingly, the probability that the data can be lost or successfully corrupted in a slot can be given by the following:

$$\theta = w_1 \mathbb{P} \text{ [Data Loss]} + w_2 \mathbb{P} \text{ [Targeted Corruption]}. \quad (31)$$

Further, for the example, let $R = R_s + VR_r$ represent the service cost per unit time. The time T for data loss or successful corruption can be distributed geometrically with the parameter θ. As result, the expected time for payout of the insured data upon losing the insured data is 1/θ. Thus, the service provider can select the storage parameters by solving the following problem:

$$(k^*, d^*) \in \arg\min_{k,d} C, \text{ such that } C \geq (1+\mu)Vp. \quad (32)$$

As shown, this is a non-linear integer program that can be solved to obtain the desired profit margin on insured data blocks.

X. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method for distributed and secure storage of a data block amongst a network of nodes as part of a blockchain, the method comprising:
   logically partitioning, by a computing device, the network of nodes into a plurality of non-overlapping zones, each zone containing a subset of the nodes such that the logical partition of the network of nodes into the plurality of non-overlapping zones is unique to the data block and differs from respective logical partitions of the network of nodes used to store other data blocks as part of the blockchain;
   generating, by the computing device, a private key for use within a particular zone of the plurality of non-overlapping zones;
   encrypting, by the computing device, the data block with the private key;
   partitioning, by the computing device, the data block as encrypted into a plurality of sub-blocks;
   distributing, by the computing device, the plurality of sub-blocks amongst a particular subset of the nodes that is within the particular zone;
   using a secret sharing process, dividing, by the computing device, the private key into a number of shares equivalent to a number of nodes in the particular subset of the nodes; and
   distributing, by the computing device, the shares of the private key amongst the particular subset of the nodes, such that each node therein receives exactly one of the shares of the private key.

2. The method of claim 1, wherein a number of the plurality of sub-blocks is equivalent to the number of nodes in the particular subset of the nodes.

3. The method of claim 2, wherein distributing the plurality of sub-blocks amongst the particular subset of the nodes comprises:
   transmitting the plurality of sub-blocks to the particular subset of the nodes such that each node therein receives exactly one sub-block of the plurality of sub-blocks.

4. The method of claim 1, wherein each of the non-overlapping zones contains an equal number of nodes.

5. The method of claim 1, further comprising:
   generating a second private key for use within a second zone of the plurality of non-overlapping zones;
   encrypting the data block with the second private key;
   partitioning the data block as encrypted with the second private key into a second plurality of sub-blocks;
   distributing the second plurality of sub-blocks amongst a second subset of the nodes that is within the second zone;
   using the secret sharing process, dividing the second private key into a second number of shares equivalent to a second number of nodes in the second subset of the nodes that is within the second zone; and
   distributing the shares of the second private key amongst the second subset of the nodes that is within the second zone, such that each node therein receives exactly one of the shares of the second private key.

6. The method of claim 1, further comprising:
   logically partitioning the network of nodes into a plurality of non-overlapping hash zones, each hash zone containing a subset of the nodes;
   determining a hash value corresponding to the data block;
   using the secret sharing process, dividing the hash value into a number of hash shares equivalent to a number of nodes in a particular hash zone of the plurality of non-overlapping hash zones; and
   distributing the hash shares amongst the nodes in the particular hash zone, such that each node therein receives exactly one of the hash shares of the hash value.

7. The method of claim 6, wherein the plurality of non-overlapping hash zones differs from the plurality of non-overlapping zones.

8. The method of claim 6, wherein the plurality of non-overlapping hash zones match the plurality of non-overlapping zones.

9. The method of claim 1, further comprising:
   obtaining the plurality of sub-blocks and the shares of the private key from the particular subset of the nodes that is within the particular zone; and
   using a combination of the shares of the private key, decrypting the plurality of sub-blocks to recreate a representation of the data block as stored within the particular zone.

10. The method of claim 9, further comprising:
    generating a second private key for use within a second zone of the plurality of non-overlapping zones;
    encrypting the data with the second private key;
    partitioning the data block as encrypted using the second private key into a second plurality of sub-blocks;
    distributing the second plurality of sub-blocks amongst a second subset of the nodes that is within the second zone;
    using the secret sharing process, dividing the second private key into a second number of shares equivalent to a second number of nodes in the second subset of the nodes; and distributing the shares of the second private key amongst the second subset of the nodes, such that each node therein receives exactly one of the shares of the second private key.

11. The method of claim 10, further comprising:
obtaining the second plurality of sub-blocks and the shares of the second private key from the second subset of the nodes that is within the second zone; and
using a combination of the shares of the second private key, decrypting the second plurality of sub-blocks to recreate a second representation of the data block as stored within the second zone.

12. The method of claim 11, further comprising:
performing a comparison between the representation of the data block as stored within the particular zone and the second representation of the data block as stored within the second zone; and
based on the representation of the data block matching the second representation of the data block, recreating the data block using the representation of the data block as stored within the particular zone.

13. The method of claim 11, further comprising:
performing a comparison between the representation of the data block as stored within the particular zone and the second representation of the data block as stored within the second zone;
based on the comparison, determining that the representation of the data block as stored within the particular zone differs from the second representation of the data block as stored within the second zone;
performing a scan of hash values stored amongst the particular subset of the nodes that is within the particular zone and the second subset of the nodes that is within the second zone;
based on the scan of the hash values, determining that one or more nodes in the particular subset of the nodes that is within the particular zone includes an inconsistent hash value; and
recreating the data block using the second representation of the data block as stored within the second zone.

14. The method of claim 1, further comprising:
logically partitioning the network of nodes into a second plurality of non-overlapping zones that is different from the plurality of non-overlapping zones, each zone containing a further subset of the nodes;
generating a second private key for use within a second zone of the second plurality of non-overlapping zones;
encrypting a second data block with the second private key;
partitioning the second data block as encrypted into a second plurality of sub-blocks;
distributing the second plurality of sub-blocks of the second data block amongst a further subset of the nodes that is within the second zone;
using the secret sharing process, dividing the second private key into a second number of shares equivalent to a second number of nodes in a second subset of the nodes; and
distributing the shares of the second private key amongst the second subset of the nodes, such that each node therein receives exactly one of the shares of the second private key.

15. A system for distributed and secure storage of a data block amongst a network of nodes as part of a blockchain, the system comprising:
a processor configured to:
logically partition a network of nodes into a plurality of non-overlapping zones, each zone containing a subset of the nodes such that the logical partition of the network of nodes into the plurality of non-overlapping zones is unique to the data block and differs from respective logical partitions of the network of nodes used to store other data blocks as part of the blockchain;
generate a private key for use within a particular zone of the plurality of non-overlapping zones;
encrypt the data block with the private key;
partition the data block as encrypted into a plurality of sub-blocks;
distribute the plurality of sub-blocks amongst a particular subset of the nodes that is within the particular zone;
using a secret sharing process, divide the private key into a number of shares equivalent to a number of nodes in the particular subset of the nodes; and
distribute the shares of the private key amongst the particular subset of the nodes, such that each node therein receives exactly one of the shares of the private key.

16. The system of claim 15, wherein a number of the plurality of sub-blocks is equivalent to the number of nodes in the particular subset of the nodes.

17. The system of claim 16, wherein encrypting the data block with the private key comprises:
encrypting the data block as a code vector;
wherein partitioning the data block as encrypted into the plurality of sub-blocks comprises:
partitioning the code vector into a plurality of components; and
wherein distribute the plurality of sub-blocks amongst the particular subset of the nodes that is within the particular zone comprises:
distributing the plurality of components of the code vector amongst the particular subset of the nodes that is within the particular zone.

18. The system of claim 15, wherein the processor is further configured to:
generate a second private key for use within a second zone of the plurality of non-overlapping zones;
encrypt the data block with the second private key;
partition the data block as encrypted with the second private key into a second plurality of sub-blocks;
distribute the second plurality of sub-blocks amongst a second subset of the nodes that is within the second zone;
using the secret sharing process, divide the second private key into a second number of shares equivalent to a second number of nodes in the second subset of the nodes that is within the second zone; and
distribute the shares of the second private key amongst the second subset of the nodes that is within the second zone, such that each node therein receives exactly one of the shares of the second private key.

19. The system of claim 15, wherein the processor is further configured to:
logically partition the network of nodes into a plurality of non-overlapping hash zones, each hash zone containing a subset of the nodes;
determine a hash value corresponding to the data block;
using the secret sharing process, divide the hash value into a number of hash shares equivalent to a number of nodes in a particular hash zone of the plurality of non-overlapping hash zones; and distribute the hash shares amongst the nodes in the particular hash zone, such that each node therein receives exactly one of the hash shares of the hash value.

20. A non-transitory computer-readable medium configured to store instructions, that when executed by a processor, cause a computing device to perform functions comprising:

logically partitioning a network of nodes into a plurality of non-overlapping zones, each zone containing a subset of the nodes such that the logical partition of the network of nodes into the plurality of non-overlapping zones is unique to a data block and differs from respective logical partitions of the network of nodes used to store other blocks as part of a blockchain;

generating a private key for use within a particular zone of the plurality of non-overlapping zones;

encrypting a data block with the private key;

partitioning the data block as encrypted into a plurality of sub-blocks;

distributing the plurality of sub-blocks amongst a particular subset of the nodes that is within the particular zone;

using a secret sharing process, dividing the private key into a number of shares equivalent to a number of nodes in the particular subset of the nodes; and distributing the shares of the private key amongst the particular subset of the nodes, such that each node therein receives exactly one of the shares of the private key.

\* \* \* \* \*